May 20, 1941.  A. H. HABERSTUMP  2,242,884
SEAT CONSTRUCTION
Filed Aug. 29, 1933
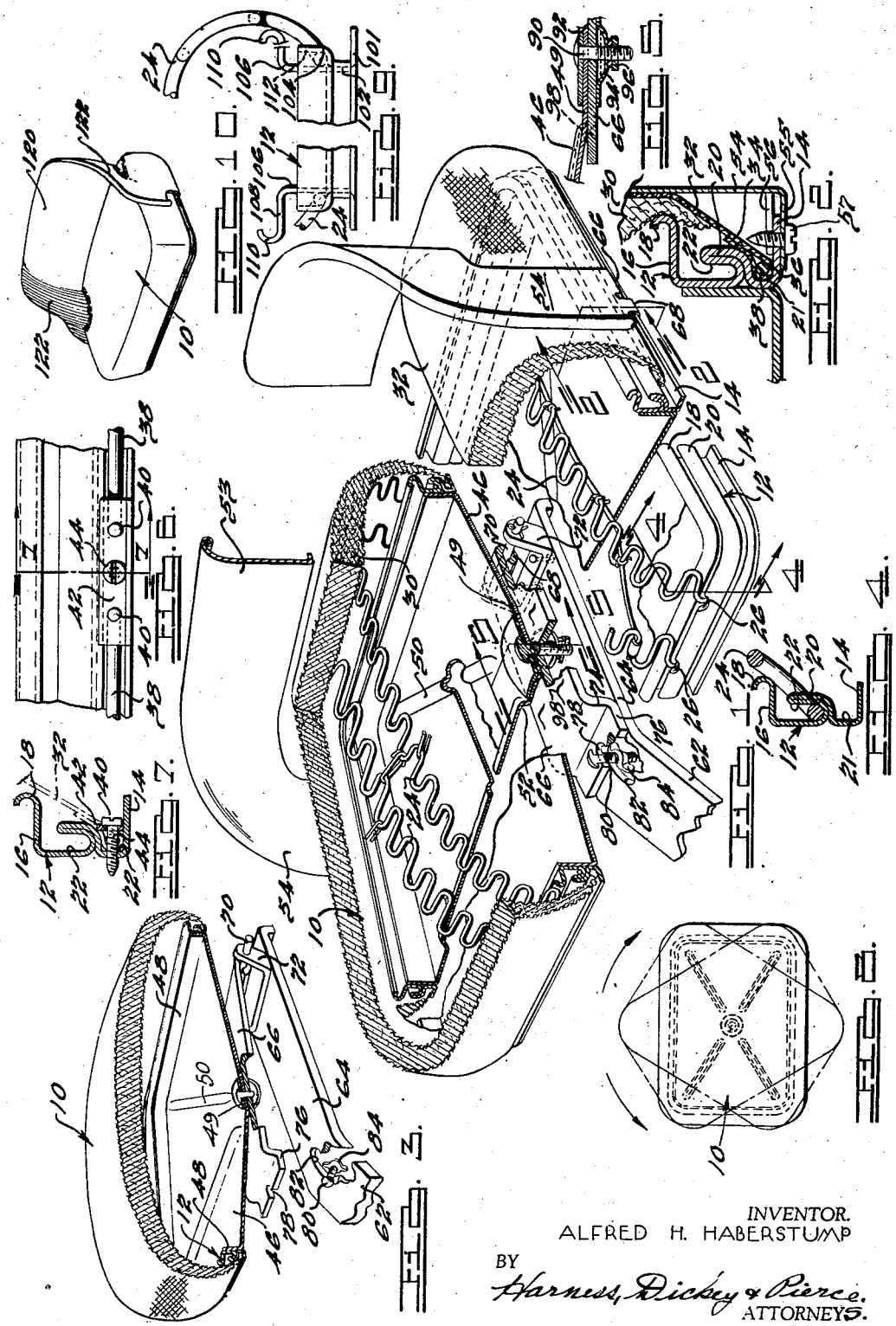
INVENTOR.
ALFRED H. HABERSTUMP
BY Harness, Dickey & Pierce
ATTORNEYS.

Patented May 20, 1941

2,242,884

UNITED STATES PATENT OFFICE 2,242,884

SEAT CONSTRUCTION

Alfred H. Haberstump, Detroit, Mich., assignor to The Murray Corporation of America, Detroit, Mich., a corporation of Delaware Application August 29, 1938, Serial No. 227,244

4 Claims. (Cl. 155—51)

This invention relates to spring seat constructions, and particularly relates to single, spring seat constructions adapted for use on farm or industrial vehicles, such as tractors.

The seat construction of the present invention is particularly adapted for use on farm implements, such as tractors, or on industrial implements, such as road construction vehicles. Such implements and vehicles are caused to traverse rough ground so that the operators thereof are subjected to constant jarring. It is also necessary that the operators reach various operating mechanisms so that according to the present invention a seat construction is provided which may swivel to various positions or which may be tilted to an out of the way position so that the operator may stand and at the same time operate the vehicle.

One of the primary objects of the present invention is to provide a seat construction including a back which is so constructed as to prevent chafing of the operator's back due to bouncing when riding over rough ground.

Another object of the invention is to provide a seat construction which swivels so that the seat may assume various positions in order to more conveniently position the operator for reaching or otherwise actuating various operating mechanisms.

Another object of the invention is to provide a seat construction which may be tilted to an out of the way position to provide clearance for the operator to stand up and still operate the tractor or other vehicle to which the seat is attached.

Another object of the invention is to provide an improved spring construction which is economical to manufacture, in which elongated spring elements of uniform length may be utilized to provide the spring supporting surface and in which the back is so arranged that it cuts across and over the rear corners of the seat to provide a proper back support in relation to the load supporting surface.

Another object of the invention is to provide an improved manner of attaching the finishing material to the seat construction.

Other objects of the invention will become apparent from the following specification, the drawing relating thereto, and from the claims hereinafter set forth.

In the drawing, in which like numerals are used to designate like parts in the several views throughout:

Figure 1 is a perspective view with parts removed and parts broken away, illustrating parts in section of a seat construction embodying features of the present invention;

Fig. 2 is a cross-sectional view taken substantially along the line 2—2 of Fig. 1;

Fig. 3 is a fragmentary perspective view with parts broken away illustrating in section, and with parts removed, of the structure illustrated in Fig. 1, particularly showing the backing plate for the seat frame and the seat partially tilted away from its support;

Fig. 4 is a fragmentary cross-sectional view, taken substantially along the line 4—4 of Fig. 1;

Fig. 5 is a fragmentary cross-sectional view, taken substantially along the line 5—5 of Fig. 1;

Fig. 6 is an elevational view illustrating the manner in which the finishing material is attached to the border frame;

Fig. 7 is a cross-sectional view, taken substantially along the line 7—7 of Fig. 6;

Fig. 8 is a top plan view, on a reduced scale, of the seat construction illustrating various swivel positions that the seat may assume;

Fig. 9 is a broken elevational view of a modified form of base frame, illustrating the manner in which the spring elements are attached thereto; and, Fig. 10 is a perspective view of a modified form of seat back for a seat construction according to the present invention.

While according to the broader aspects of the present invention the seat construction is of general utility, it is particularly adapted to support a single person and be used on the type of equipment above mentioned. Also, according to certain of the broader aspects of the present invention, various types of spring elements may be used to form the spring load supporting surface; but the seat of the present invention is particularly adapted for the uses intended when elongated sinuous spring elements of the type disclosed in the patent to Kaden, No. 2,002,399, issued May 21, 1935, are used to provide the spring supporting surface. Such spring elements embody in general a length of wire bent into sinuous shape and provided with a set on an arc of smaller radius than the arc the elements assume when their ends are fixed in position. This initial or permanent set in the spring provides material resistance against downward displacement when the ends of the spring are drawn outwardly and anchored to assume an arc of longer radius. When the spring strip is so disposed a material resistance against deflection is provided which increases with an increase in load providing desirable spring characteristics to the resulting seat formed thereby.

Referring to the drawing and referring particularly to Figs. 1 to 8 thereof, a seat generally indicated at 10 is shown which includes a substantially rectangular border frame element 12. The border frame element 12 is preferably formed of a rolled section of metal having an outwardly disposed flange 14 adjacent the lower edge thereof and an outwardly disposed flange 16 adjacent the upper edge thereof. The flange 16 is reversely bent as indicated at 18 to provide a curved edge against which the padding and spring elements bear as will become more apparent from the following description. The base of the frame 12 is folded upon itself to provide an intermediate flange 20 which forms an outwardly disposed channel 21 with the lower flange 14. The flange 20 is preferably bent slightly upwardly to form an upwardly opening channel 22. As stated above the frame 12 is substantially rectangular in shape, thus providing front, rear and end edges.

Elongated spiral spring elements 24 of the type disclosed in the Kaden patent above mentioned span the frame 12 and are connected to the front and rear edges thereof. The last lateral convolution of each of the spring elements 24 is adapted to be received within the channel 22 which is then crimped downwardly over such last lateral convolution as indicated at 26. The ends of the spring elements 24 are thus fixed in position, and the arrangement of the channel 22 relative to the edge portion 18 of the frame is such that the ends of the spring elements are reversed upon themselves for positioning within the channel 22 with the inner surfaces of the elements 24 bearing against the rolled edge 18. By such a construction the last lateral convolutions of the spring elements may be pivoted within the channel and those portions of the spring elements immediately adjacent the last lateral convolutions overhang the front and rear edges of the border frame so that soft edges are provided which have particular advantage along the front edge of the seat.

A layer of padding material 30 is disposed on the upper surface of the spring elements 24 and extends around the outwardly facing side of the frame 12. A layer of fabric finish material 32, preferably waterproofed, is disposed over the padding material and extends downwardly over the sides of the border frame. The lower edge of the finish material 32 is folded inwardly upon itself as indicated at 34 and preferably secured by stitching to provide a tunnel 36 therearound. A wire element 38 is received within the tunnel and extends around the frame but is of slightly less length than the peripheral length of the frame. The spring element 38 terminates in outwardly disposed bent ends 40 which are adapted to be received through openings in a plate member 42. The wire element 38 with the plate member 42 serve to retain the finish material 32 in position on the border frame in that the wire element 38 in its position within the tunnel 36 is adapted to be received within the channel 21 formed adjacent the flange 14. The plate 42 serves to retain the ends 40 of the wire element 38 in position. The plate 42 is then fixed to the frame 12 by means of a screw 44 or the like which extends through the plate 42 and is received within a threaded opening in the base of the channel 21.

A backing plate 46 which is complementary in shape to the rectangular shape of the frame 12 has an upturned flange 48 around the edges thereof, which upturned flange is adapted to be received within the inner face of the border frame 12 and be secured thereto by spot welding or the like. The backing plate 46 serves as a mounting for the seat and also serves as a cushioning member in that an air cushion is provided between the backing member 46 and the seat padding.

The backing plate 46 is sloped from the four edges thereof outwardly toward the media point thereof where it terminates in a substantially flat media portion 49. The backing member 46 is also formed with inwardly disposed ribs 50 extending from the corners toward the media point of the seat which serve to strengthen the seat construction and also provide grooves or recesses 52 adjacent the media point of the seat on the under-surface thereof for a purpose to be described in detail hereinafter.

By using a substantially rectangular frame, spring elements 24 of substantially uniform length may be utilized to provide the load supporting surface. In order to prevent chafing of an operator's back when using the seat and to provide a seat which is particularly adapted for the uses to which the seat of the present invention is intended, a seat back member 53 is provided which has downwardly disposed side portions 54 which lie substantially parallel with the end edges of the seat. The ends 54 terminate in an inwardly disposed flange 55 and another inwardly disposed flange 56 which is spaced to the rear of the flange 55 and is also spaced upwardly therefrom. The two flanges 55 and 56 thus provide a space therebetween within which the flange 14 is adapted to be received. The flange 55 thus lies on the under-surface of the flange 14 and the flange 56 overlies the flange 14. A screw 57 may be passed through an opening in the flange 55 and be received within a threaded opening in the flange 14 for fixing each end of the seat back to the border frame 12. The seat back 53 is so shaped that it cuts across and overlies the rear corners of the seat, with the major portion of the back then extending along and above the rear edge of the seat preferably immediately above the rear edge of the border frame 12.

The seat just described is adapted to be mounted upon a vehicle so that the seat may be swiveled relative to the vehicle and also may be tilted to an out of the way position so that an operator of the vehicle may turn to manipulate various operating mechanisms and may tilt the seat out of position so that he may stand and continue to operate the vehicle.

The mounting means includes an elongated supporting member 62 which is generally in the form of an elongated tongue extending longitudinally of the vehicle and sometimes projecting rearwardly beyond the rear edge thereof. The supporting member 62 terminates in a substantially horizontal portion 64. An elongated mounting member 66 is turned as indicated at 68 at the rear edge thereof to provide an opening through which a pivot pin 70 is received. The pivot pin 70 is mounted in spaced relation to the supporting portion 64 by means of an upstanding U-shaped bracket 72 having openings therethrough through which the ends of the pivot pin 70 extend.

The forward end of the member 66 is bent downwardly as indicated at 74 and then flanged forwardly as indicated at 76 so that the major portion of the member 66 is spaced from the horizontal portion 64. The member 66 may thus be pivoted or tilted relative to the supporting member 62 about the pivot pin 70. The forward end flange 76 of the member 66 is provided with a forwardly opening recess 78 which is adapted to cooperate with a pin member 80 for releasably fixing the forward end of the member 66 to the supporting member 62. The pin member 80 is received through an elongated slot 82 in the member 62 and is provided with a wing nut 84 which is adapted to bear against the undersurface of the member 62 when it is desired to fix the forward end of the member 66 to the supporting member 62.

So that the seat 10 may be swiveled relative to the supporting member 62, a threaded pivot pin 90 is disposed through an opening in the flat portion 49 of the backing plate 46, and a washer 92 is preferably disposed between the head of the pin 90 and the top surface of the flat portion 49. The pin 90 extends downwardly through an opening in the member 66 intermediate the ends thereof, and a spring washer 94 is adapted to be received over the pin 90 and resiliently bear against the under-surface of the member 66. A nut 96 is threadably received over the lower threaded end of the pin member 90 so that the spring washer 94 may be tightly urged against the member 66. This structure provides a swivel connection between the seat and the supporting member 66 so that the seat may be swiveled to various positions as indicated in Fig. 8. In order to retain the seat in its various swiveled positions, upwardly disposed knobs 98 are formed in the top surface of the member 66. Such knobs are so arranged that they are adapted to be received within the recesses or depressions 52 in the under-surface of the backing member 46 so that while the seat may be positively moved from one of its swivel positions to another it is firmly held in one position against unintentional displacement.

The seat construction above described is exceptionally simple in both its construction and its use. The operator of a vehicle to which the seat is attached may very easily turn from one position to another so that he is in the best position for performing various operative functions of the vehicle, and the seat may be tilted to an out of the way position so that the operator may stand and continue to operate his vehicle in the usual way.

In Fig. 9 a modified form of border frame 12 is illustrated in which the frame is generally rectangular in shape the same as in the embodiment described above. The cross-sectional configuration is different, however, in that an outwardly disposed flange 101 is formed around all four edges thereof which corresponds to the flange 14 above described. The upper portion of the border frame is then drawn outwardly above the wall portion 102 to provide an overhanging portion 104 therearound. The overhanging portion 104 forms with the flange 101 and the base 102 a channel corresponding to the channel 22 above described for the reception of the wire element 38.

In order to retain the spring elements 24 in place and properly position the spring elements so that the ends thereof overhang the front and rear edges of the border frame, an upstanding plate member 106 is disposed along the forward edge of the border frame and is fixed to the wall portion 102 by spot welding or the like. A similar plate member is similarly attached to the rear edge of the border frame. Each of the plate members 106 is bent outwardly as indicated at 108, which corresponds to the flange 16 above described and is rolled inwardly as indicated at 110, which corresponds to the rolled edge 18 above described. The plate member 106 thus forms with the inner wall of the overhanging portion 104 along the front and rear edges of the border frame an upwardly disposed channel 112. This channel is adapted to receive the last lateral convolution of each of the spring elements 24. Upwardly opening slots may be provided in the wall of the overhanging portion 104 so that the spring elements may extend therethrough. The wall portions may then be crimped over the last lateral convolution so that the ends of the spring elements 24 are anchored in place. The spring elements 24 are then adapted to bear against the rolled edges 110 so that the spring elements overhang the edges of the border frame, and the ends thereof are reversed upon themselves for attachment within the channels 112.

In Fig. 10 a modified form of back is illustrated in which the back is substantially solid throughout. The back 120 is formed of a sheet metal member which extends downwardly along the sides and along the back to a position adjacent the lower edge of the border frame. This back may be attached to the border frame in a manner similar to that described above or the lower edge of the back may be merely flanged inwardly and spot welded to the under-surface of the flange 14. So that the back cuts across and overlies the corners of the seat 10, it is drawn or shaped inwardly as indicated at 122. As in the embodiment described above this structure defines a load supporting area of proper relation and position relative to the supporting back 120.

Formal changes may be made in the specific embodiments of the invention described without departing from the spirit and substance of the invention, the scope of which is commensurate with the appended claims.

What I claim is:

1. A vehicle seat construction comprising a supporting member extending toward the rear of said vehicle, an elongated mounting member overlying said supporting member, means pivotally connecting the rear end of said mounting member to said supporting member, means releasably connecting the opposite end of said mounting member to said supporting member, a spring seat structure, and swivel means located at substantially the media point of said seat structure connecting said seat structure to said mounting member, whereby said seat structure may be swiveled and tilted back relative to said supporting member.

2. A vehicle seat construction comprising an elongated supporting member extending toward the rear of said vehicle and having a substantially horizontal portion adjacent the rear end thereof, an elongated mounting member disposed over said horizontal portion, means pivotally connecting the rear end of said mounting member to the horizontal portion of said supporting member, means releasably connecting the other end of said mounting member to said supporting member, a spring seat structure having a resilient load supporting surface, said spring seat structure including a backing member disposed under said spring surface, and swivel means located at substantially the media point of said backing member connecting said backing member to said mounting member, whereby said seat structure may be swiveled and tilted back relative to said supporting member.

3. A vehicle seat construction comprising an elongated supporting member extending toward the rear of said vehicle, an elongated mounting member overlying said supporting member, means pivotally connecting the rear end of said mounting member to said supporting member, a seat structure including spring elements forming a resilient load supporting surface, a backing member on said seat disposed under said spring elements, swivel means located at substantially the media point of said seat connecting said seat to said mounting member, whereby said seat may be swiveled and tilted back relative to said supporting member, and means to releasably fix said seat in its swiveled position.

4. A vehicle seat construction comprising a supporting member extending toward the rear of said vehicle, an elongated mounting member disposed over said supporting member, means pivotally connecting one end of said mounting member to said supporting member, a spring seat including a border frame, elongated spring elements spanning said frame and connected to opposite edges thereof, a plate-like backing member connected to said border frame, and swivel means located at substantially the media point of said backing member connecting said seat to said mounting member, whereby said seat may be swiveled and tilted relative to said supporting member.

ALFRED H. HABERSTUMP.